United States Patent
Zhang

(10) Patent No.: US 10,075,267 B2
(45) Date of Patent: Sep. 11, 2018

(54) INTERFERENCE COORDINATION METHOD AND BASE STATION

(71) Applicant: HUAWEI TECHNOLOGIES CO., LTD., Shenzhen, Guangdong (CN)

(72) Inventor: Lili Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 113 days.

(21) Appl. No.: 15/325,482

(22) PCT Filed: Jul. 11, 2014

(86) PCT No.: PCT/CN2014/082049
§ 371 (c)(1),
(2) Date: Jan. 11, 2017

(87) PCT Pub. No.: WO2016/004623
PCT Pub. Date: Jan. 14, 2016

(65) Prior Publication Data
US 2017/0141889 A1 May 18, 2017

(51) Int. Cl.
*H04L 5/00* (2006.01)
*H04W 72/04* (2009.01)

(52) U.S. Cl.
CPC .......... *H04L 5/0032* (2013.01); *H04L 5/0073* (2013.01); *H04W 72/0426* (2013.01)

(58) Field of Classification Search
CPC ... H04L 5/0032; H04L 5/0073; H04L 5/0035; H04W 72/0426; H04W 72/0406
See application file for complete search history.

(56) References Cited

U.S. PATENT DOCUMENTS

2013/0044704 A1  2/2013  Pang et al.
2013/0225192 A1  8/2013  Yamamoto et al.
(Continued)

FOREIGN PATENT DOCUMENTS

CN   102186247 A   9/2011
CN   103202077 A   7/2013
(Continued)

OTHER PUBLICATIONS

International Search Report, dated Apr. 14, 2015, in International Application No. PCT/CN2014/082049 (4 pp.).
(Continued)

*Primary Examiner* — Ian N Moore
*Assistant Examiner* — Brian T Le
(74) *Attorney, Agent, or Firm* — Staas & Halsey LLP

(57) ABSTRACT

Embodiments of the present invention provide an interference coordination method and a base station. The method includes: allocating, by a base station, a first almost blank subframe to one or more first base stations that are interfered with by the base station; sending, by the base station, a first message to one or more second base stations that interfere with the base station, where the first message includes information used to indicate the first almost blank subframe; and obtaining, by the base station, a second almost blank subframe that is allocated by the one or more second base stations to the base station, where the second almost blank subframe is different from the first almost blank subframe. Therefore, a resource collision problem in interference coordination can be eliminated, and resource utilization can be improved.

14 Claims, 2 Drawing Sheets

(56) References Cited

U.S. PATENT DOCUMENTS

| | | | |
|---|---|---|---|
| 2013/0279419 A1 | 10/2013 | Li et al. | |
| 2014/0050131 A1* | 2/2014 | Takano | H04W 72/082 370/280 |
| 2015/0131553 A1* | 5/2015 | Centonza | H04W 24/10 370/329 |
| 2016/0029321 A1* | 1/2016 | Hwang | H04J 11/005 455/450 |

FOREIGN PATENT DOCUMENTS

| | | |
|---|---|---|
| WO | 2012/158959 A1 | 11/2012 |
| WO | 2013/138986 A1 | 9/2013 |
| WO | 2014/021762 A1 | 2/2014 |
| WO | 2014/047838 A1 | 4/2014 |

OTHER PUBLICATIONS

International Search Report dated Apr. 14, 2015 in corresponding to International Application PCT/CN2014/082049.

3GPP TR 36.932 V12.0.0; $3^{rd}$ Generation Partnership Project; Technical Specification Group Radio Access Network, "Scenarios and Requirements for Small Cell Enhancements for E-UTRA and E-UTRAN (Release 12)," Sophia Antipolis, France, Dec. 2012.

3GPP TR 36.932 V12.1.0; $3^{rd}$ Generation Partnership Project; Technical Specification Group Radio Access Network, "Scenarios and Requirements for small cell enhancements for E-UTRA and E-UTRAN (Release 12)," Sophia Antipolis, France, Mar. 2013.

3GPP TS 36.423 V11.4.0; $3^{rd}$ Generation Partnership Project; Technical Specification Group Radio Access Network; Evolved Universal Terrestrial Radio Access Network (E-UTRAN), "X2 application protocol (X2AP) (Release 11)," Sophia Antipolis, France, Mar. 2013.

3GPP TS 36.423 V12.2.0; $3^{rd}$ Generation Partnership Project; Technical Specification Group Radio Access Network; Evolved Universal Terrestrial Radio Access Network (E-UTRAN), "X2 application protocol (X2AP) (Release 12)," Sophia Antipolis, France, Jun. 2014.

Extended European Search Report dated May 26, 2017 in corresponding European Application 14897017.1.

Ericsson, et al., "Introduction of X2 signaling support for eICIC," 3GPP TSG-RAN3 Meeting #70, Jacksonville, USA, Nov. 15-19, 2010.

Huawei, et al., "New Study Item Proposal for Small Cell Enhancements for E-UTRA and E-UTRAN—Physical-layer Aspects," 3GPP TSG-RAN Meeting #58, Barcelona, Spain, Dec. 4-7, 2012.

ZTE, "Interference avoidance and coordination enhancement in small cell," 3GPP TSG RAN WG1 Meeting #72bis, Chicago, USA, Apr. 15-19, 2013.

* cited by examiner

INTERFERENCE COORDINATION METHOD AND BASE STATION

CROSS-REFERENCE TO RELATED APPLICATIONS

This application is a National Stage of International Application No. PCT/CN2014/082049, filed on Jul. 11, 2014, which is hereby incorporated by reference in its entirety.

TECHNICAL FIELD

Embodiments of the present invention relate to the communications field, and more specifically, to an interference coordination method and a base station.

BACKGROUND

A heterogeneous network (English full name: Heterogeneous Network, English abbreviation: HetNet) is a network type of a Long Term Evolution (English full name: Long Term Evolution, English abbreviation: LTE) network. Several micro cells are deployed in a coverage area of a macro cell, to form a co-coverage heterogeneous system. The micro cells are mainly deployed in a weak-coverage area or a hotspot area of the macro cell, which can improve a network capacity. In addition, introduction of the micro cells may bring extra inter-cell interference to the heterogeneous network.

To resolve an interference problem, in a current enhanced inter-cell interference coordination (English full name: enhanced inter-cell interference coordination, English abbreviation: eICIC) solution, basically some subframes of a macro eNB are set to almost blank subframes (English full name: Almost Blank Subframe, English abbreviation: ABS).

However, when the micro cells are densely distributed, interference caused by the macro cell to the micro cells is not unique interference, and interference between the micro cells cannot be ignored. If the current enhanced interference coordination solution is applied to the micro cells, resource overlap occurs in almost blank subframes of micro cells with mutual interference. If a related micro cell continues to use the almost blank subframes with overlapped resources, resource collision and throughput reduction are caused. If the related micro cell no longer uses the almost blank subframes with overlapped resources, spectrum resource utilization efficiency reduction is caused, or extra system overheads brought by almost blank subframe reallocation are caused.

SUMMARY

Embodiments of the present invention provide an interference coordination method and a base station, so that a resource collision problem in interference coordination can be eliminated, and resource utilization can be improved.

A first aspect provides an interference coordination method, and the method includes: allocating, by a base station, a first almost blank subframe to one or more first base stations that are interfered with by the base station; sending, by the base station, a first message to one or more second base stations that interfere with the base station, where the first message includes information used to indicate the first almost blank subframe; and obtaining, by the base station, a second almost blank subframe that is allocated by the one or more second base stations to the base station, where the second almost blank subframe is different from the first almost blank subframe.

With reference to the first aspect, in a first possible implementation manner of the first aspect, the first message further includes information used to indicate an almost blank subframe that is forbidden to be allocated, where the almost blank subframe that is forbidden to be allocated includes the first almost blank subframe.

With reference to the first possible implementation manner of the first aspect, in a second possible implementation manner of the first aspect, the sending, by the base station, a first message to one or more second base stations that interfere with the base station includes: setting, by the base station, an almost blank subframe information element that is forbidden to be allocated, adding, to the first message, the almost blank subframe information element that is forbidden to be allocated, and sending the first message to the one or more second base stations that interfere with the base station, where the almost blank subframe information element that is forbidden to be allocated is indicated in a manner of a bitmap, each bit of the bitmap represents one subframe, and bit setting indicates the almost blank subframe that is forbidden to be allocated.

With reference to the first possible implementation manner of the first aspect, in a third possible implementation manner of the first aspect, that the second almost blank subframe is different from the first almost blank subframe includes: the second almost blank subframe is different from the almost blank subframe that is forbidden to be allocated; or the second almost blank subframe is orthogonal to the almost blank subframe that is forbidden to be allocated.

With reference to the first aspect, in a fourth possible implementation manner of the first aspect, the first message further includes information used to indicate an almost blank subframe that is allowed to be allocated, where the almost blank subframe that is allowed to be allocated does not include the first almost blank subframe.

With reference to the fourth possible implementation manner of the first aspect, in a fifth possible implementation manner of the first aspect, the sending, by the base station, a first message to one or more second base stations that interfere with the base station includes: setting, by the base station, an almost blank subframe information element that is allowed to be allocated, adding, to the first message, the almost blank subframe information element that is allowed to be allocated, and sending the first message to the one or more second base stations that interfere with the base station, where the almost blank subframe information element that is allowed to be allocated is indicated in a manner of a bitmap, each bit of the bitmap represents one subframe, and bit setting indicates the almost blank subframe that is allowed to be al located.

With reference to the fourth possible implementation manner of the first aspect, in a sixth possible implementation manner of the first aspect, that the second almost blank subframe is different from the first almost blank subframe includes: the second almost blank subframe is the same as the almost blank subframe that is allowed to be allocated; or the second almost blank subframe is a subset of the almost blank subframe that is allowed to be allocated.

With reference to the first aspect, in a seventh possible implementation manner of the first aspect, the method further includes: receiving, by the base station, a second message sent by the one or more first base stations, where the second message is used to request the base station to allocate the first almost blank subframe to the one or more first base stations; and the allocating, by a base station, a first almost blank subframe to one or more first base stations that are interfered with by the base station includes: allocating, by the base station according to the second message sent by the one or more first base stations, the first almost blank subframe to the one or more first base stations that are interfered with by the base station.

With reference to any one of the first aspect, or the first to the seventh possible implementation manners of the first aspect, in an eighth possible implementation manner of the first aspect, that the second almost blank subframe is different from the first almost blank subframe includes: the second almost blank subframe is orthogonal to the first almost blank subframe.

With reference to any one of the first aspect, or the first to the seventh possible implementation manners of the first aspect, in a ninth possible implementation manner of the first aspect, the method further includes: receiving, by the base station, a third almost blank subframe that is allocated by the one or more first base stations to one or more third base stations that are interfered with by the one or more first base stations; and the allocating, by a base station, a first almost blank subframe to one or more first base stations that are interfered with by the base station includes: allocating, by the base station, the first almost blank subframe to the one or more first base stations that are interfered with by the base station, where the first almost blank subframe is different from the third almost blank subframe.

With reference to any one of the first aspect, or the first to the seventh possible implementation manners of the first aspect, in a tenth possible implementation manner of the first aspect, the second almost blank subframes that are allocated by the one or more second base stations to the base station are the same.

With reference to any one of the first aspect, or the first to the seventh possible implementation manners of the first aspect, in an eleventh possible implementation manner of the first aspect, the base station, the first base station, and the second base station are all macro eNBs; the base station, the first base station, and the second base station are all micro eNBs; or the base station, the first base station, and the second base station are all pico eNBs.

With reference to any one of the first aspect, or the first to the seventh possible implementation manners of the first aspect, in a twelfth possible implementation manner of the first aspect, the first message is a request indication message, where the request indication message is used to request the one or more second base stations to allocate the second almost blank subframe to the base station.

A second aspect provides a base station, including: an allocation unit, configured to allocate a first almost blank subframe to one or more first base stations that are interfered with by the base station; a sending unit, configured to send a first message to one or more second base stations that interfere with the base station, where the first message includes information used to indicate the first almost blank subframe; and an obtaining unit, configured to obtain a second almost blank subframe that is allocated by the one or more second base stations to the base station, where the second almost blank subframe is different from the first almost blank subframe.

With reference to the second aspect, in a first possible implementation manner of the second aspect, the first message further includes information used to indicate an almost blank subframe that is forbidden to be allocated, where the almost blank subframe that is forbidden to be allocated includes the first almost blank subframe.

With reference to the first possible implementation manner of the second aspect, in a second possible implementation manner of the second aspect, the base station further includes: a first setting unit, configured to set an almost blank subframe information element that is forbidden to be allocated, where the almost blank subframe information element that is forbidden to be allocated is indicated in a manner of a bitmap, each bit of the bitmap represents one subframe, and bit setting indicates the almost blank subframe that is forbidden to be allocated; and the sending unit is specifically configured to add, to the first message, the almost blank subframe information element that is forbidden to be allocated, and send the first message to the one or more second base stations that interfere with the base station.

With reference to the first possible implementation manner of the second aspect, in a third possible implementation manner of the second aspect, that the second almost blank subframe is different from the first almost blank subframe includes: the second almost blank subframe is different from the almost blank subframe that is forbidden to be allocated; or the second almost blank subframe is orthogonal to the almost blank subframe that is forbidden to be allocated.

With reference to the second aspect, in a fourth possible implementation manner of the second aspect, the first message further includes information used to indicate an almost blank subframe that is allowed to be allocated, where the almost blank subframe that is allowed to be allocated does not include the first almost blank subframe.

With reference to the fourth possible implementation manner of the second aspect, in a fifth possible implementation manner of the second aspect, the base station further includes:

a second setting unit, configured to set an almost blank subframe information element that is allowed to be allocated, where the almost blank subframe information element that is allowed to be allocated is indicated in a manner of a bitmap, each bit of the bitmap represents one subframe, and bit setting indicates the almost blank subframe that is allowed to be allocated; and the sending unit is specifically configured to add, to the first message, the almost blank subframe information element that is allowed to be allocated, and send the first message to the one or more second base stations that interfere with the base station.

With reference to the fourth possible implementation manner of the second aspect, in a sixth possible implementation manner of the second aspect, that the second almost blank subframe is different from the first almost blank subframe includes: the second almost blank subframe is the same as the almost blank subframe that is allowed to be allocated; or the second almost blank subframe is a subset of the almost blank subframe that is allowed to be allocated.

With reference to the second aspect, in a seventh possible implementation manner of the second aspect, the base station further includes: a receiving unit, configured to receive a second message sent by the one or more first base stations, where the second message is used to request the base station to allocate the first almost blank subframe to the one or more first base stations; and the allocation unit is specifically configured to allocate, according to the second message sent by the one or more first base stations, the first almost blank subframe to the one or more first base stations that are interfered with by the base station.

With reference to any one of the second aspect, or the first to the seventh possible implementation manners of the second aspect, in an eighth possible implementation manner of the second aspect, the receiving unit is further configured to receive a third almost blank subframe that is allocated by the one or more first base stations to one or more third base stations that are interfered with by the one or more first base stations; and the allocation unit is specifically configured to allocate the first almost blank subframe to the one or more first base stations that are interfered with by the base station, where the first almost blank subframe is different from the third almost blank subframe.

With reference to any one of the second aspect, or the first to the seventh possible implementation manners of the second aspect, in a ninth possible implementation manner of the second aspect, that the second almost blank subframe is different from the first almost blank subframe includes: the second almost blank subframe is orthogonal to the first almost blank subframe.

With reference to any one of the second aspect, or the first to the seventh possible implementation manners of the second aspect, in a tenth possible implementation manner of the second aspect, the second almost blank subframes that are allocated by the one or more second base stations to the base station are the same.

With reference to any one of the second aspect, or the first to the seventh possible implementation manners of the second aspect, in an eleventh possible implementation manner of the second aspect, the base station, the first base station, and the second base station are all macro eNBs; the base station, the first base station, and the second base station are all micro eNBs; or the base station, the first base station, and the second base station are all pico eNBs.

With reference to any one of the second aspect, or the first to the seventh possible implementation manners of the second aspect, in a twelfth possible implementation manner of the second aspect, the first message is a request indication message, where the request indication message is used to request the one or more second base stations to allocate the second almost blank subframe to the base station.

In conclusion, according to the interference coordination method and the base station in the embodiments of present invention, a resource collision problem in interference coordination can be eliminated, and resource utilization can be improved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be understood that, the technical solutions of the present invention may be applied to various communications systems such as a Global System for Mobile Communications (English full name: Global System of Mobile communication, English abbreviation: GSM) system, a Code Division Multiple Access (English full name: Code Division Multiple Access, English abbreviation: CDMA) system, a Wideband Code Division Multiple Access (English full name: Wideband Code Division Multiple Access, English abbreviation: WCDMA) system, a general packet radio service (English full name: General Packet Radio Service, English abbreviation: GPRS), an LTE system, a Long Term Evolution Advanced (English full name: Advanced Long Term Evolution, English abbreviation: LTE-A) system, and a Universal Mobile Telecommunications System (English full name: Universal Mobile Telecommunication System, English abbreviation: UMTS).

It should be understood that in the embodiments of the present invention, user equipment (English full name: User Equipment, English abbreviation: UE) includes but is not limited to a mobile station (English full name: Mobile Station, English abbreviation: MS), a mobile terminal (English full name: Mobile Terminal), a mobile telephone (English full name: Mobile Telephone), a handset (English full name: handset), portable equipment (English full name: portable equipment), and the like. The user equipment may communicate with one or more core networks by using a radio access network (English full name: Radio Access Network, English abbreviation: RAN). For example, the user equipment may be a mobile telephone (or referred to as a "cellular" phone), or a computer having a wireless communication function, or the user equipment may be a portable, pocket-sized, handheld, computer built-in, or in-vehicle mobile apparatus.

In the embodiments of the present invention, the base station may be a base transceiver station (English full name: Base Transceiver Station, English abbreviation: BTS) in GSM or CDMA, or may be a NodeB (NodeB) in WCDMA, or may be an evolved NodeB (English full name: evolved Node B, English abbreviation: eNB or e-NodeB) in LTE, which is not limited in the embodiments of the present invention.

Figure 1:
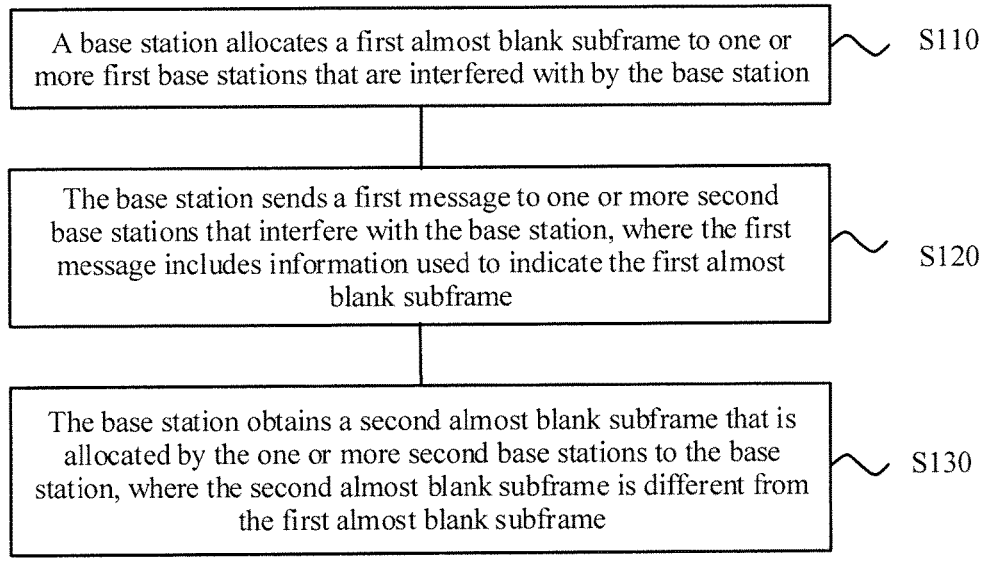
FIG. 1 shows a schematic diagram of an interference coordination method according to an embodiment of the present invention.

FIG. 1 shows an interference coordination method 100, and the method 100 may be performed, for example, by a base station. As shown in FIG. 1, the method 100 includes the following steps.

S110. The base station allocates a first almost blank subframe (English full name: Almost Blank Subframe, English abbreviation: ABS) to one or more first base stations that are interfered with by the base station.

It should be understood that interference between base stations is signal interference between the base stations. When micro cells are densely distributed, in addition to interference between a macro cell and each micro cell, there is also mutual interference between the micro cells. In this case, not only a macro base station (such as macro eNB) allocates an ABS to a micro NodeB that is interfered with by the macro base station, but the micro NodeB (such as a remote radio frequency unit (RRU), a pico eNB (Pico eNB), a home eNodeB (Home eNB), or a relay eNodeB (relay eNB)) also allocates an ABS to a micro NodeB that is interfered with by the micro NodeB, to coordinate interference between the micro cells.

S120. The base station sends a first message to one or more second base stations that interfere with the base station, where the first message includes information used to indicate the first almost blank subframe.

It should be noted that the first base station is different from the second base station, the base station may send, by using multiple methods, the first almost blank subframe to the one or more second base stations that interfere with the base station, and the information used to indicate the almost blank subframe may have multiple indication manners, which are not limited herein.

S130. The base station obtains a second almost blank subframe that is allocated by the one or more second base stations to the base station, where the second almost blank subframe is different from the first almost blank subframe.

It should be noted that the base station may obtain the second almost blank subframe by using multiple methods, and there may be multiple manners for indicating that the second almost blank subframe is different from the first almost blank subframe, which are not limited herein.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

The interference coordination method according to this embodiment of the present invention is described above in detail with reference to FIG. 1.

This embodiment of the present invention is described in more detail in the following with reference to a specific example. It should be noted that the example in FIG. 1 is only intended to help a person skilled in the art understand this embodiment of the present invention, but is not intended to restrict this embodiment of the present invention to a specific numerical value or a specific scenario that is illustrated. A person skilled in the art apparently can make various equivalent modifications or changes according to the example provided in FIG. 1, which also fall within a protection scope of this embodiment of the present invention.

According to this embodiment of the present invention, the first message is a request indication (such as invoke indication) message, and the request indication message is used to request the one or more second base stations to allocate the second almost blank subframe to the base station.

It should be noted that the request indication message includes a request indication (invoke indication) information element (English full name: information element, English abbreviation: IE), and the request indication information element indicates a type of information that a sending base station expects a receiving base station to send.

Optionally, the first message further includes information used to indicate an almost blank subframe that is forbidden to be allocated, and the almost blank subframe that is forbidden to be allocated includes the first almost blank subframe.

It should be noted that the base station may add, to the first message by using multiple methods, the almost blank subframe that is forbidden to be allocated, and send the first message to the one or more second base stations that interfere with the base station, which are not limited herein.

Optionally, that the base station sends a first message to one or more second base stations that interfere with the base station includes: the base station sets an almost blank subframe information element that is forbidden to be allocated, adds, to the first message, the almost blank subframe information element that is forbidden to be allocated, and sends the first message to the one or more second base stations that interfere with the base station, where the almost blank subframe information element that is forbidden to be allocated is indicated in a manner of a bitmap, each bit of the bitmap represents one subframe, and bit setting (that is, 1 is assigned to a bit) indicates the almost blank subframe that is forbidden to be allocated.

It should be noted that the first message includes a request indication (invoke indication) information element (English full name: information element, English abbreviation: IE), where the request indication information element indicates a type of information that a sending base station expects a receiving base station to send. In addition to adding ABS information to an existing request indication to indicate that ABS mode information is expected to be allocated, information about the almost blank subframe that is forbidden to be allocated is added, to expect that the receiving base station also considers, when allocating an ABS, the information about the almost blank subframe that is forbidden to be allocated.

It should be noted that the almost blank subframe information element that is forbidden to be allocated may be indicated in a manner of a bitmap (which may be, for example, 70 bits). Each bit of the bitmap represents one subframe, and bit setting (that is, 1 is assigned to a bit) indicates that the subframe is already allocated as an ABS resource by the base station, and therefore, it is expected that the second base station is forbidden to allocate the subframe as an ABS resource of the second base station, to avoid interference from the second base station; and that a bit is not set (that is, 0 is assigned to the bit) is used to indicate an opposite meaning, that is, an ABS resource that is allowed to be allocated by the second base station.

Optionally, that the second almost blank subframe is different from the first almost blank subframe includes: the second almost blank subframe is different from the almost blank subframe that is forbidden to be allocated; or the second almost blank subframe is orthogonal to the almost blank subframe that is forbidden to be allocated.

It should be understood that, in a communications system in which an orthogonal frequency division multiplexing (English full name: Orthogonal Frequency Division Multiplexing, English abbreviation: OFDM) technology is used, such as an LTE communications system, different subcarriers or subframes are orthogonal to each other.

Optionally, the first message further includes information used to indicate an almost blank subframe that is allowed to be allocated, and the almost blank subframe that is allowed to be allocated does not include the first almost blank subframe.

It should be noted that the base station may add, to the first message by using multiple methods, the almost blank subframe that is allowed to be allocated, and send the first message to the one or more second base stations that interfere with the base station, which are not limited herein.

Optionally, that the base station sends a first message to one or more second base stations that interfere with the base station includes: the base station sets an almost blank subframe information element that is allowed to be allocated, adds, to the first message, the almost blank subframe information element that is allowed to be allocated, and sends the first message to the one or more second base stations that interfere with the base station, where the almost blank subframe information element that is allowed to be allocated is indicated in a manner of a bitmap, each bit of the bitmap represents one subframe, and bit setting (that is, 1 is assigned to a bit) indicates the almost blank subframe that is allowed to be allocated.

It should be noted that the first message includes a request indication (invoke indication) information element (English full name: information element, English abbreviation: IE), where the request indication information element indicates a type of information that a sending base station expects a receiving base station to send. In addition to adding ABS information to an existing request indication to indicate that ABS mode information is expected to be allocated, information about the almost blank subframe that is allowed to be allocated is added, to expect that the receiving base station also considers, when allocating an ABS, the information about the almost blank subframe that is allowed to be allocated.

It should be noted that the almost blank subframe information element that is allowed to be allocated may be indicated in a manner of a bitmap (which may be, for example, 70 bits). Each bit of the bitmap represents one subframe, and bit setting (that is, 1 is assigned to a bit) indicates that the subframe is not allocated as an ABS resource by the base station, and therefore, it is expected that the second base station allocates the subframe as an ABS resource of the second base station, to avoid interference from the second base station; and that a bit is not set (that is, 0 is assigned to the bit) is used to indicate an opposite meaning, that is, an ABS resource that is forbidden to be allocated by the second base station.

Optionally, that the second almost blank subframe is different from the first almost blank subframe includes: the second almost blank subframe is the same as the almost blank subframe that is allowed to be allocated; or the second almost blank subframe is a subset of the almost blank subframe that is allowed to be allocated.

Optionally, that the second almost blank subframe is different from the first almost blank subframe includes: the second almost blank subframe is orthogonal to the first almost blank subframe.

It should be understood that, in a communications system in which an orthogonal frequency division multiplexing (English full name: Orthogonal Frequency Division Multiplexing, English abbreviation: OFDM) technology is used, such as an LTE communications system, different subcarriers or subframes are orthogonal to each other.

Optionally, the method further includes:

receiving, by the base station, a third message sent by the one or more first base stations, where the third message is used to request the base station to allocate the first almost blank subframe to the one or more first base stations; and that the base station allocates a first almost blank subframe to one or more first base stations that are interfered with by the base station includes: allocating, by the base station according to the third message sent by the one or more first base stations, the first almost blank subframe to the one or more first base stations that are interfered with by the base station.

It should be noted that the base station may actively allocate an ABS to the first base station, or may allocate an ABS according to a request indication message sent by the first base station.

Optionally, the method further includes:

receiving, by the base station, a third almost blank subframe that is allocated by the one or more first base stations to one or more third base stations that are interfered with by the one or more first base stations; and that the base station allocates a first almost blank subframe to one or more first base stations that are interfered with by the base station includes: allocating, by the base station, the first almost blank subframe to the one or more first base stations that are interfered with by the base station, where the first almost blank subframe is different from the third almost blank subframe.

It may be understood that, after the base station obtains third ABS allocated by the first base station to the one or more third base stations that are interfered with by the one or more first base stations, the base station allocates an ABS resource that is different from the third ABS to the first base station. Therefore, an ABS resource collision problem in inter-cell interference coordination can be eliminated, and resource utilization can be improved.

Optionally, the second almost blank subframes that are allocated by the one or more second base stations to the base station are the same.

It should be understood that user equipment needs to measure a cell in an ABS, and therefore, allocating same ABSs by multiple second base stations makes it convenient for the user equipment to perform network measurement on a cell in which the multiple second base stations are located, which facilitates a communications setup process, a handover process, and the like of the user equipment.

Optionally, the base station, the first base station, and the second base station are all macro eNBs (macro eNB); the base station, the first base station, and the second base station are all micro eNBs (micro eNB); or the base station, the first base station, and the second base station are all pico eNBs (pico eNB).

It should be understood that the base station, the first base station, and the second base station in this embodiment may all be macro eNBs, may all be micro eNBs, or may all be pico eNBs; or the base station, the first base station, and the second base station in this embodiment may be separately any one of a macro eNB, a micro eNB, or a pico eNB.

Therefore, in the interference coordination method provided in this embodiment of the present invention, the second almost blank subframe that is allocated by the one or more second base stations to the base station is different from the first almost blank subframe that is allocated by the base station to the one or more first base stations that are interfered with by the base station. Therefore, a resource collision problem in interference coordination can be eliminated, and resource utilization can be improved.

The interference coordination method according to the embodiment of the present invention is described above in detail with reference to FIG. 1, and a base station according to an embodiment of the present invention is described in detail in the following with reference to FIG. 2.

Figure 2:
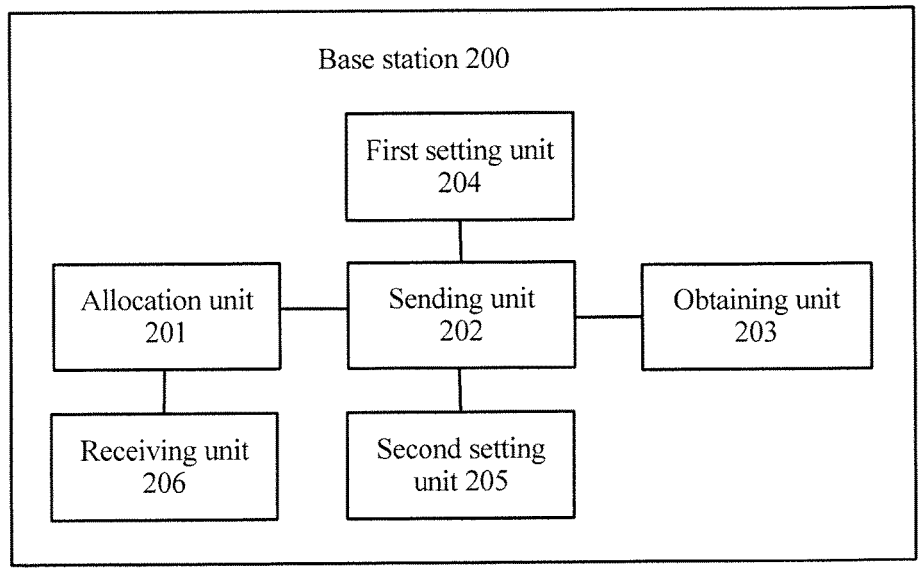
FIG. 2 shows a schematic block diagram of a base station according to an embodiment of the present invention.

FIG. 2 shows a schematic block diagram of a base station 200 according to an embodiment of the present invention. As shown in FIG. 2, the base station 200 includes an allocation unit 201, a sending unit 202, and an obtaining unit 203.

The allocation unit 201 is configured to allocate a first almost blank subframe (English full name: Almost Blank Subframe, English abbreviation: ABS) to one or more first base stations that are interfered with by the base station.

It should be understood that interference between base stations is signal interference between the base stations. When micro cells are densely distributed, in addition to interference between a macro cell and each micro cell, there is also mutual interference between the micro cells. In this case, not only a macro base station (such as macro eNB)

allocates an ABS to a micro NodeB that is interfered with by the macro base station, but the micro NodeB (such as a remote radio frequency unit (RRU), a pico eNB (Pico eNB), a home eNodeB (Home eNB), or a relay eNodeB (relay eNB)) also allocates an ABS to a micro NodeB that is interfered with by the micro NodeB, to coordinate interference between the micro cells.

The sending unit 202 is configured to send a first message to one or more second base stations that interfere with the base station, where the first message includes information used to indicate the first almost blank subframe.

It should be noted that the first base station is different from the second base station, the base station may send, by using multiple methods, the first almost blank subframe to the one or more second base stations that interfere with the base station, and the information used to indicate the almost blank subframe may have multiple indication manners, which are not limited herein.

The obtaining unit 203 is configured to obtain a second almost blank subframe that is allocated by the one or more second base stations to the base station, where the second almost blank subframe is different from the first almost blank subframe.

It should be noted that the base station may obtain the second almost blank subframe by using multiple methods, and there may be multiple manners for indicating that the second almost blank subframe is different from the first almost blank subframe, which are not limited herein.

The base station according to this embodiment of the present invention is described above in detail with reference to FIG. 2.

This embodiment of the present invention is described in more detail in the following with reference to a specific example. It should be noted that the example in FIG. 2 is only intended to help a person skilled in the art understand this embodiment of the present invention, but is not intended to restrict this embodiment of the present invention to a specific numerical value or a specific scenario that is illustrated. A person skilled in the art apparently can make various equivalent modifications or changes according to the example provided in FIG. 2, which also fall within a protection scope of this embodiment of the present invention.

According to this embodiment of the present invention, the first message is a request indication (invoke indication) message, and the request indication message is used to request the one or more second base stations to allocate the second almost blank subframe to the base station.

It should be noted that the request indication message includes a request indication (invoke indication) information element (English full name: information element, English abbreviation: IE), and the request indication information element indicates a type of information that a sending base station expects a receiving base station to send.

Optionally, the first message further includes information used to indicate an almost blank subframe that is forbidden to be allocated, and the almost blank subframe that is forbidden to be allocated includes the first almost blank subframe.

It should be noted that the base station may add, to the first message by using multiple methods, the almost blank subframe that is forbidden to be allocated, and send the first message to the one or more second base stations that interfere with the base station, which are not limited herein.

Optionally, the base station 200 further includes:
a first setting unit 204, configured to set an almost blank subframe information element that is forbidden to be allocated, where the almost blank subframe information element that is forbidden to be allocated is indicated in a manner of a bitmap, each bit of the bitmap represents one subframe, and bit setting (that is, 1 is assigned to a bit) indicates the almost blank subframe that is forbidden to be allocated.

The sending unit 202 is specifically configured to add, to the first message, the almost blank subframe information element that is forbidden to be allocated, and send the first message to the one or more second base stations that interfere with the base station.

It should be noted that the first message includes a request indication (invoke indication) information element (English full name: information element, English abbreviation: IE), where the request indication information element indicates a type of information that a sending base station expects a receiving base station to send. In addition to adding ABS information to an existing request indication to indicate that ABS mode information is expected to be allocated, information about the almost blank subframe that is forbidden to be allocated is added, to expect that the receiving base station also considers, when allocating an ABS, the information about the almost blank subframe that is forbidden to be allocated.

It should be noted that the almost blank subframe information element that is forbidden to be allocated may be indicated in a manner of a bitmap (which may be, for example, 70 bits). Each bit of the bitmap represents one subframe, and bit setting (that is, 1 is assigned to a bit) indicates that the subframe is already allocated as an ABS resource by the base station, and therefore, it is expected that the second base station is forbidden to allocate the subframe as an ABS resource of the second base station, to avoid interference from the second base station; and that a bit is not set (that is, 0 is assigned to the bit) is used to indicate an opposite meaning, that is, an ABS resource that is allowed to be allocated by the second base station.

Optionally, that the second almost blank subframe is different from the first almost blank subframe includes: the second almost blank subframe is different from the almost blank subframe that is forbidden to be allocated; or the second almost blank subframe is orthogonal to the almost blank subframe that is forbidden to be allocated.

It should be understood that, in a communications system in which an orthogonal frequency division multiplexing (English full name: Orthogonal Frequency Division Multiplexing, English abbreviation: OFDM) technology is used, such as an LTE communications system, different subcarriers or subframes are orthogonal to each other.

Optionally, the first message further includes information used to indicate an almost blank subframe that is allowed to be allocated, and the almost blank subframe that is allowed to be allocated does not include the first almost blank subframe.

It should be noted that the base station may add, to the first message by using multiple methods, the almost blank subframe that is allowed to be allocated, and send the first message to the one or more second base stations that interfere with the base station, which are not limited herein.

Optionally, the base station 200 further includes:
a second setting unit 205, configured to set an almost blank subframe information element that is allowed to be allocated, where the almost blank subframe information element that is allowed to be allocated is indicated in a manner of a bitmap, each bit of the bitmap represents one subframe, and bit setting (that is, 1 is assigned to a bit) indicates the almost blank subframe that is allowed to be allocated.

The sending unit 202 is specifically configured to add, to the first message, the almost blank subframe information element that is allowed to be allocated, and send the first message to the one or more second base stations that interfere with the base station.

It should be noted that the first message includes a request indication (invoke indication) information element (English full name: information element, English abbreviation: IE), where the request indication information element indicates a type of information that a sending base station expects a receiving base station to send. In addition to adding ABS information to an existing request indication to indicate that ABS mode information is expected to be allocated, information about the almost blank subframe that is allowed to be allocated is added, to expect that the receiving base station also considers, when allocating an ABS, the information about the almost blank subframe that is allowed to be allocated.

It should be noted that the almost blank subframe information element that is allowed to be allocated may be indicated in a manner of a bitmap (which may be, for example, 70 bits). Each bit of the bitmap represents one subframe, and bit setting (that is, 1 is assigned to a bit) indicates that the subframe is not allocated as an ABS resource by the base station, and therefore, it is expected that the second base station allocates the subframe as an ABS resource of the second base station, to avoid interference from the second base station; and that a bit is not set (that is, 0 is assigned to the bit) is used to indicate an opposite meaning, that is, an ABS resource that is forbidden to be allocated by the second base station.

Optionally, that the second almost blank subframe is different from the first almost blank subframe includes: the second almost blank subframe is the same as the almost blank subframe that is allowed to be allocated; or the second almost blank subframe is a subset of the almost blank subframe that is allowed to be allocated.

Optionally, that the second almost blank subframe is different from the first almost blank subframe includes: the second almost blank subframe is orthogonal to the first almost blank subframe.

It should be understood that, in a communications system in which an orthogonal frequency division multiplexing (English full name: Orthogonal Frequency Division Multiplexing, English abbreviation: OFDM) technology is used, such as an LTE communications system, different subcarriers or subframes are orthogonal to each other.

Optionally, the base station 200 further includes:

a receiving unit 206, configured to receive a third message sent by the one or more first base stations, where the third message is used to request the base station to allocate the first almost blank subframe to the one or more first base stations.

The allocation unit 201 is specifically configured to allocate, according to the third message sent by the one or more first base stations, the first almost blank subframe to the one or more first base stations that are interfered with by the base station.

It should be noted that the base station may actively allocate an ABS to the first base station that is interfered with by the base station, or may allocate an ABS according to a request indication message sent by the first base station.

Optionally, the receiving unit 206 is further configured to receive a third almost blank subframe that is allocated by the one or more first base stations to one or more third base stations that are interfered with by the one or more first base stations.

The allocation unit 201 is specifically configured to allocate the first almost blank subframe to the one or more first base stations that are interfered with by the base station, where the first almost blank subframe is different from the third almost blank subframe.

It may be understood that, the first base station is different from the third base station, and after the base station obtains third ABS allocated by the first base station to the third base station that is interfered with by the first base station, the base station allocates an ABS resource that is different from the third ABS to the first base station. Therefore, an ABS resource collision problem in inter-cell interference coordination can be eliminated, and resource utilization can be improved.

Optionally, the second almost blank subframes that are allocated by the one or more second base stations to the base station are the same.

It should be understood that user equipment needs to measure a cell in an ABS, and therefore, allocating same ABSs by multiple second base stations makes it convenient for the user equipment to perform network measurement on the multiple second base stations, which facilitates a communications setup process, a handover process, and the like of the user equipment.

Optionally, the base station, the first base station, and the second base station are all macro eNBs (macro eNB); the base station, the first base station, and the second base station are all micro eNBs (micro eNB); or the base station, the first base station, and the second base station are all pico eNBs (pico eNB).

It should be understood that the base station, the first base station, and the second base station in this embodiment may all be macro eNBs, may all be micro eNBs, or may all be pico eNBs; or the base station, the first base station, and the second base station in this embodiment may be separately any one of a macro eNB, a micro eNB, or a pico eNB.

Therefore, in the base station provided in this embodiment of the present invention, the second almost blank subframe that is allocated by the one or more second base stations to the base station is different from the first almost blank subframe that is allocated by the base station to the one or more first base stations that are interfered with by the base station. Therefore, a resource collision problem in interference coordination can be eliminated, and resource utilization can be improved.

Figure 3:
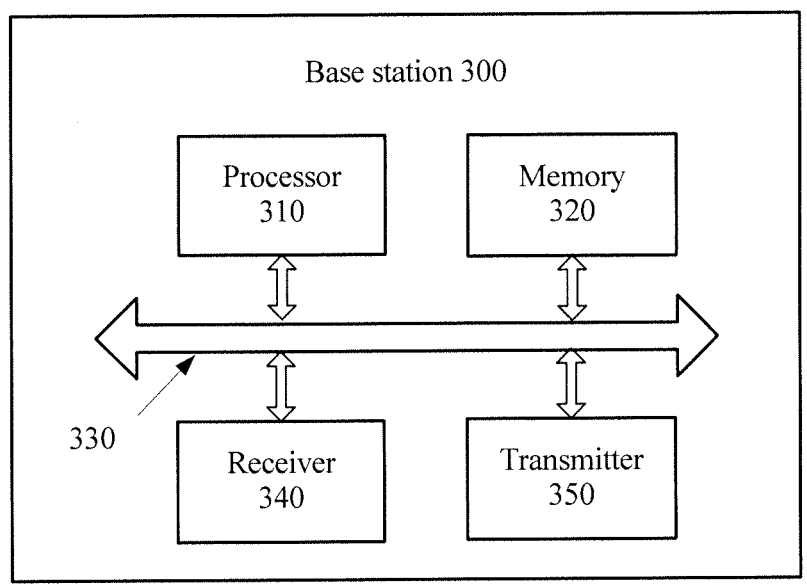
FIG. 3 shows a schematic block diagram of a base station according to an embodiment of the present invention.

From a perspective of another implementation manner, as shown in FIG. 3, an embodiment of the present invention further provides a base station 300. The base station 300 includes a processor 310, a memory 320, a bus system 330, a receiver 340, and a transmitter 350. The processor 310, the memory 320, the receiver 340, and the transmitter 350 are connected by using the bus system 330. The memory 320 is configured to store an instruction, and the processor 310 is configured to execute the instruction stored in the memory 320, to control the receiver 340 to receive a signal, an instruction, or a message and control the transmitter 350 to send a signal, signaling, or a message. The processor 310 is configured to allocate a first almost blank subframe to one or more first base stations that are interfered with by the base station; the transmitter 350 is configured to send a first message to one or more second base stations that interfere with the base station, where the first message includes information used to indicate the first almost blank subframe; and the receiver 340 is configured to obtain a second almost blank subframe that is allocated by the one or more second base stations to the base station, where the second almost blank subframe is different from the first almost blank subframe.

Optionally, the first message is a request indication (invoke indication) message, and the request indication message is used to request the one or more second base stations to allocate the second almost blank subframe to the base station.

It should be noted that the request indication message includes a request indication (invoke indication) information element (English full name: information element, English abbreviation: IE), and the request indication information element indicates a type of information that a sending base station expects a receiving base station to send.

Optionally, the first message further includes information used to indicate an almost blank subframe that is forbidden to be allocated, and the almost blank subframe that is forbidden to be allocated includes the first almost blank subframe.

It should be noted that the base station may add, to the first message by using multiple methods, the almost blank subframe that is forbidden to be allocated, and send the first message to the one or more second base stations that interfere with the base station, which are not limited herein.

Optionally, the processor 310 sets an almost blank subframe information element that is forbidden to be allocated, where the almost blank subframe information element that is forbidden to be allocated is indicated in a manner of a bitmap, each bit of the bitmap represents one subframe, and bit setting (that is, 1 is assigned to a bit) indicates the almost blank subframe that is forbidden to be allocated.

The transmitter 350 adds, to the first message, the almost blank subframe information element that is forbidden to be allocated, and sends the first message to the one or more second base stations that interfere with the base station.

It should be noted that the first message includes a request indication (invoke indication) information element (English full name: information element, English abbreviation: IE), where the request indication information element indicates a type of information that a sending base station expects a receiving base station to send. In addition to adding ABS information to an existing request indication to indicate that ABS mode information is expected to be allocated, information about the almost blank subframe that is forbidden to be allocated is added, to expect that the receiving base station also considers, when allocating an ABS, the information about the almost blank subframe that is forbidden to be allocated.

It should be noted that the almost blank subframe information element that is forbidden to be allocated may be indicated in a manner of a bitmap (which may be, for example, 70 bits). Each bit of the bitmap represents one subframe, and bit setting (that is, 1 is assigned to a bit) indicates that the subframe is already allocated as an ABS resource by the base station, and therefore, it is expected that the second base station is forbidden to allocate the subframe as an ABS resource of the second base station, to avoid interference from the second base station; and that a bit is not set (that is, 0 is assigned to the bit) is used to indicate an opposite meaning, that is, an ABS resource that is allowed to be allocated by the second base station.

Optionally, that the second almost blank subframe is different from the first almost blank subframe includes: the second almost blank subframe is different from the almost blank subframe that is forbidden to be allocated; or the second almost blank subframe is orthogonal to the almost blank subframe that is forbidden to be allocated.

It should be understood that, in a communications system in which an orthogonal frequency division multiplexing (English full name: Orthogonal Frequency Division Multiplexing, English abbreviation: OFDM) technology is used, such as an LTE communications system, different subcarriers or subframes are orthogonal to each other.

Optionally, the first message further includes information used to indicate an almost blank subframe that is allowed to be allocated, and the almost blank subframe that is allowed to be allocated does not include the first almost blank subframe.

It should be noted that the base station may add, to the first message by using multiple methods, the almost blank subframe that is allowed to be allocated, and send the first message to the one or more second base stations that interfere with the base station, which are not limited herein.

Optionally, the processor 310 sets an almost blank subframe information element that is allowed to be allocated, where the almost blank subframe information element that is allowed to be allocated is indicated in a manner of a bitmap, each bit of the bitmap represents one subframe, and bit setting (that is, 1 is assigned to a bit) indicates the almost blank subframe that is allowed to be allocated.

The transmitter 350 adds, to the first message, the almost blank subframe information element that is allowed to be allocated, and sends the first message to the one or more second base stations that interfere with the base station.

It should be noted that the first message includes a request indication (invoke indication) information element (English full name: information element, English abbreviation: IE), where the request indication information element indicates a type of information that a sending base station expects a receiving base station to send. In addition to adding ABS information to an existing request indication to indicate that ABS mode information is expected to be allocated, information about the almost blank subframe that is allowed to be allocated is added, to expect that the receiving base station also considers, when allocating an ABS, the information about the almost blank subframe that is allowed to be allocated.

It should be noted that the almost blank subframe information element that is allowed to be allocated may be indicated in a manner of a bitmap (which may be, for example, 70 bits). Each bit of the bitmap represents one subframe, and bit setting (that is, 1 is assigned to a bit) indicates that the subframe is not allocated as an ABS resource by the base station, and therefore, it is expected that the second base station allocates the subframe as an ABS resource of the second base station, to avoid interference from the second base station; and that a bit is not set (that is, 0 is assigned to the bit) is used to indicate an opposite meaning, that is, an ABS resource that is forbidden to be allocated by the second base station.

Optionally, that the second almost blank subframe is different from the first almost blank subframe includes: the second almost blank subframe is the same as the almost blank subframe that is allowed to be allocated; or the second almost blank subframe is a subset of the almost blank subframe that is allowed to be allocated.

Optionally, that the second almost blank subframe is different from the first almost blank subframe includes: the second almost blank subframe is orthogonal to the first almost blank subframe.

It should be understood that, in a communications system in which an orthogonal frequency division multiplexing (English full name: Orthogonal Frequency Division Multiplexing, English abbreviation: OFDM) technology is used, such as an LTE communications system, different subcarriers or subframes are orthogonal to each other.

Optionally, the receiver 340 receives a third message sent by the one or more first base stations, where the third message is used to request the base station to allocate the first almost blank subframe to the one or more first base stations.

The processor 310 allocates, according to the third message sent by the one or more first base stations, the first almost blank subframe to the one or more first base stations that are interfered with by the base station.

It should be noted that the base station may actively allocate an ABS to the first base station that is interfered with by the base station, or may allocate an ABS according to a request indication message sent by the first base station.

Optionally, the receiver 340 receives a third almost blank subframe that is allocated by the one or more first base stations to one or more third base stations that are interfered with by the one or more first base stations.

The processor 310 allocates the first almost blank subframe to the one or more first base stations that are interfered with by the base station, where the first almost blank subframe is different from the third almost blank subframe.

It may be understood that, the first base station is different from the third base station, and after the base station obtains third ABS allocated by the first base station to the third base station that is interfered with by the first base station, the base station allocates an ABS resource that is different from the third ABS to the first base station. Therefore, an ABS resource collision problem in inter-cell interference coordination can be eliminated, and resource utilization can be improved.

Optionally, the second almost blank subframes that are allocated by the one or more second base stations to the base station are the same.

It should be understood that user equipment needs to measure a cell in an ABS, and therefore, allocating same ABSs by multiple second base stations makes it convenient for the user equipment to perform network measurement on the multiple second base stations, which facilitates a communications setup process, a handover process, and the like of the user equipment.

Optionally, the base station, the first base station, and the second base station are all macro eNBs (macro eNB); the base station, the first base station, and the second base station are all micro eNBs (micro eNB); or the base station, the first base station, and the second base station are all pico eNBs (pico eNB).

It should be understood that the base station, the first base station, and the second base station in this embodiment may all be macro eNBs, may all be micro eNBs, or may all be pico eNBs; or the base station, the first base station, and the second base station in this embodiment may be separately any one of a macro eNB, a micro eNB, or a pico eNB, which is not limited herein.

It should be understood that, in this embodiment of the present invention, the processor 310 may be a central processing unit (Central Processing Unit, "CPU" for short), or the processor 310 may be another general purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may further be any conventional processor, or the like.

The memory 320 may include a read-only memory and a random access memory, and provide an instruction and data to the processor 310. A part of the memory 320 may further include a non-volatile random access memory. For example, the memory 320 may further store information of a device type.

The bus system 330 may further include a power bus, a control bus, a status signal bus, and the like, in addition to a data bus. However, for clear description, various types of buses in the figure are marked as the bus system 330.

In an implementation process, the steps in the foregoing methods may be completed by using an integrated logic circuit of hardware in the processor 310 or an instruction in a form of software. The steps of the method disclosed with reference to the embodiments of the present invention may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory 320, and a processor 310 reads information in the memory 320 and completes the steps in the foregoing methods in combination with hardware of the processor. To avoid repetition, details are not described herein again.

It should be understood that the base station 200 according to the embodiment of the present invention may be corresponding to the base station in the interference coordination method in the embodiments of the present invention. The foregoing and other operations and/or functions of modules in the base station 200 are separately used to implement corresponding procedures of the methods in FIG. 1. For brevity, details are not described herein again.

In addition, a computer readable media (or medium) is further provided, including a computer readable instruction that performs, upon being executed, the following operation: performing the operations of S110 to S130 in the method in the foregoing embodiment.

In addition, a computer program product is further provided, including the foregoing computer readable medium.

Therefore, in the base station provided in this embodiment of the present invention, the second almost blank subframe that is allocated by the one or more second base stations to the base station is different from the first almost blank subframe that is allocated by the base station to the one or more first base stations that are interfered with by the base station. Therefore, a resource collision problem in interference coordination can be eliminated, and resource utilization can be improved.

It should be noted that the information mentioned in the specification includes but is not limited to an indication, a signal, signaling, a message, or the like, which is not limited herein.

The term "and/or" in this specification describes only an association relationship for describing associated objects and represents that three relationships may exist. For example, A and/or B may represent the following three cases: Only A exists, both A and B exist, and only B exists. In addition, the character "I" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An interference coordination method, comprising:
    allocating, by a base station, a first almost blank subframe to one or more first base stations that are interfered with by the base station;
    sending, by the base station, a first message to one or more second base stations that interfere with the base station, wherein the first message comprises information used to indicate the first almost blank subframe and information used to indicate an almost blank subframe that is forbidden to be allocated, and the almost blank subframe that is forbidden to be allocated comprises the first almost blank subframe,
    wherein the sending comprising:
        setting, by the base station, an almost blank subframe information element that is forbidden to be allocated, adding, to the first message, the almost blank subframe information element that is forbidden to be allocated, and sending the first message to the one or more second base stations that interfere with the base station, wherein the almost blank subframe information element that is forbidden to be allocated is indicated in a manner of a bitmap, each bit of the bitmap represents one subframe, and bit setting indicates the almost blank subframe that is forbidden to be allocated; and
    obtaining, by the base station, a second almost blank subframe that is allocated by the one or more second base stations to the base station, wherein the second almost blank subframe is different from the first almost blank subframe.

2. The method according to claim 1, wherein that the second almost blank subframe is different from the first almost blank subframe comprises:
    the second almost blank subframe is different from the almost blank subframe that is forbidden to be allocated; or
    the second almost blank subframe is orthogonal to the almost blank subframe that is forbidden to be allocated.

3. The method according to claim 1, wherein the first message further comprises information used to indicate an almost blank subframe that is allowed to be allocated, and the almost blank subframe that is allowed to be allocated does not comprise the first almost blank subframe.

4. The method according to claim 3, wherein the sending, by the base station, a first message to one or more second base stations that interfere with the base station comprises:
    setting, by the base station, an almost blank subframe information element that is allowed to be allocated, adding, to the first message, the almost blank subframe information element that is allowed to be allocated, and sending the first message to the one or more second base stations that interfere with the base station, wherein the almost blank subframe information element that is allowed to be allocated is indicated in a manner of a bitmap, each bit of the bitmap represents one subframe, and bit setting indicates the almost blank subframe that is allowed to be allocated.

5. The method according to claim 3, wherein that the second almost blank subframe is different from the first almost blank subframe comprises:

the second almost blank subframe is the same as the almost blank subframe that is allowed to be allocated; or the second almost blank subframe is a subset of the almost blank subframe that is allowed to be allocated.

6. The method according to claim 1, wherein the method further comprises:

receiving, by the base station, a second message sent by the one or more first base stations, wherein the second message is used to request the base station to allocate the first almost blank subframe to the one or more first base stations; and the allocating, by a base station, a first almost blank subframe to one or more first base stations that are interfered with by the base station comprises:

allocating, by the base station according to the second message sent by the one or more first base stations, the first almost blank subframe to the one or more first base stations that are interfered with by the base station.

7. The method according to claim 1, wherein the first message is a request indication message, and the request indication message is used to request the one or more second base stations to allocate the second almost blank subframe to the base station.

8. A base station, comprising:

a memory to store instructions; and a processor to execute the instructions to cause the base station to implement:

an allocation unit, configured to allocate a first almost blank subframe to one or more first base stations that are interfered with by the base station;

a sending unit, configured to send a first message to one or more second base stations that interfere with the base station, wherein the first message comprises information used to indicate the first almost blank subframe and information used to indicate an almost blank subframe that is forbidden to be allocated, and the almost blank subframe that is forbidden to be allocated comprises the first almost blank subframe;

an obtaining unit, configured to obtain a second almost blank subframe that is allocated by the one or more second base stations to the base station, wherein the second almost blank subframe is different from the first almost blank subframe; and a first setting unit, configured to set an almost blank subframe information element that is forbidden to be allocated, wherein the almost blank subframe information element that is forbidden to be allocated is indicated in a manner of a bitmap, each bit of the bitmap represents one subframe, and bit setting indicates the almost blank subframe that is forbidden to be allocated; wherein the sending unit is configured to add, to the first message, the almost blank subframe information element that is forbidden to be allocated, and send the first message to the one or more second base stations that interfere with the base station.

9. The base station according to claim 8, wherein that the second almost blank subframe is different from the first almost blank subframe comprises:

the second almost blank subframe is different from the almost blank subframe that is forbidden to be allocated; or the second almost blank subframe is orthogonal to the almost blank subframe that is forbidden to be allocated.

10. The base station according to claim 8, wherein the first message further comprises information used to indicate an almost blank subframe that is allowed to be allocated, and the almost blank subframe that is allowed to be allocated does not comprise the first almost blank subframe.

11. The base station according to claim 10, wherein the processor is further configured to implement:

a second setting unit, configured to set an almost blank subframe information element that is allowed to be allocated, wherein the almost blank subframe information element that is allowed to be allocated is indicated in a manner of a bitmap, each bit of the bitmap represents one subframe, and bit setting indicates the almost blank subframe that is allowed to be allocated; and the sending unit is specifically configured to add, to the first message, the almost blank information element that is allowed to be allocated, and send the first message to the one or more second base stations that interfere with the base station.

12. The base station according to claim 10, wherein that the second almost blank subframe is different from the first almost blank subframe comprises:

the second almost blank subframe is the same as the almost blank subframe that is allowed to be allocated; or the second almost blank subframe is a subset of the almost blank subframe that is allowed to be allocated.

13. The base station according to claim 8, wherein the processor is further configured to implement:

a receiving unit, configured to receive a second message sent by the one or more first base stations, wherein the second message is used to request the base station to allocate the first almost blank subframe to the one or more first base stations; and the allocation unit is specifically configured to allocate, according to the second message sent by the one or more first base stations, the first almost blank subframe to the one or more first base stations that are interfered with by the base station.

14. The base station according to claim 8, wherein the first message is a request indication message, and the request indication message is used to request the one or more second base stations to allocate the second almost blank subframe to the base station.

* * * * *